United States Patent
Riemhofer et al.

[15] 3,668,276
[45] June 6, 1972

[54] COATING COMPOSITIONS COMPRISING AMINOPLASTS AND POLYESTER BLENDS

[72] Inventors: Franz Riemhofer; Walter Dittmann; Uwe Biethan; Karl-Heinz Hornung; Ernst-Christian Schutze, all of Marl, Germany

[73] Assignee: Chemische Werke Huls Aktiengesellschaft, Marl, Germany

[22] Filed: Oct. 23, 1969

[21] Appl. No.: 868,901

[30] Foreign Application Priority Data

Oct. 25, 1968 Germany.....................P 18 05 189.3
Oct. 25, 1968 Germany.....................P 18 05 196.2

[52] U.S. Cl..................260/850, 117/132 A, 117/132 BF, 117/161 K, 117/161 LN, 260/29.4 R, 260/33.6 R, 260/39 R, 260/75 R, 260/826, 260/831, 260/835
[51] Int. Cl...........................................C08q 37/34
[58] Field of Search..........................260/850, 75

[56] References Cited

UNITED STATES PATENTS

| | | | |
|---|---|---|---|
| 2,936,296 | 5/1960 | Precopio et al. | 260/850 |
| 3,338,743 | 8/1967 | Laganis | 260/850 |
| 3,374,114 | 3/1968 | Wiener | 260/75 R |
| 3,378,402 | 4/1968 | Wiener | 260/75 R |

Primary Examiner—John C. Bleutge
Attorney—I. William Millen

[57] ABSTRACT

Coating compositions resistant to yellowing, solvents, acids and alkalies and having the combination of high elasticity and good hardness are produced by using a mixture of
  a. an aminoplast and
  b. a polyester having an average molecular weight of 800–5,000 of (I) an alcohol mixture which contains an aliphatic polyol having three to four hydroxyl groups and three to six carbon atoms and a diol which includes 1,4-bis(hydroxymethyl)-cyclohexane, and (II) an acid mixture of one or more cyclic dicarboxylic acids and one or more acyclic dicarboxylic acids or functional acid derivatives thereof.

18 Claims, No Drawings

COATING COMPOSITIONS COMPRISING AMINOPLASTS AND POLYESTER BLENDS

BACKGROUND OF THE INVENTION

This invention relates to coating compositions containing as the binder a mixture consisting of an aminoplast and a polyester.

It is known that so-called oil-free alkyd resins in combination with aminoplasts are suitable for the production of varnish films. The varnish films produced from these polyesters are said to exhibit excellent hardness, at a given flexibility, and in this connection, the polyesters of neopentyl glycol and the polyesters prepared, with the use of glycidyl esters, from monocarboxylic acids which contain nine to 11 carbon atoms, and whose carbon chain is branched in the $\alpha$-position to the carboxyl group, are reported to be especially superior (H.L. Gerhardt and E.E. Parker, Ind. Engng. Chem. 59, No. 8, 42 [1967]).

Also, in U.S. Pat. No. 2,860,119 and in the publication of D.L. Edwards, D.C. Finney and P. T. von Bramer in "Deutsche Farbenzeitschrift," 20, 519 (1966), oil-free alkyd resins are described having as their base diols or polyols with a neopentyl structure which, after cross-linking with aminoplasts, are said to result in varnish films with a good resistance to chemicals, great hardness and good flexibility. However, such oil-free alkyd resins can be produced only with difficulty. Moreover, although they are hard, they exhibit a relatively low elasticity, as shown in comparative Example 1, below.

It is known from U.S. Pat. No. 3,207,715 that polyesters of trimellitic anhydride, neopentyl glycol and adipic acid, in combination with tetrakis-(alkoxymethyl)benzoguanamines, result in varnish films which are said to exhibit a good resistance to chemicals and good flexibility. However, the values reported in this patent demonstrate that although the flexibility of these varnish films is improved, the absolute values thereof are still very low.

U.S. Pat. No. 3,158,584 describes alkyd resins of a phthalic acid, a polyvalent alcohol and a dimer of an unsaturated aliphatic monocarboxylic acid containing 14–22 carbon atoms, which, in combination with aminoplasts, results in varnish films having both hardness and elasticity. However, the thus-produced varnish films have a strong tendency to yellow and do not exhibit adequate resistance to solvents.

In U.S. Pat. No. 2,460,186, polyesters of 2-ethylhexanediol-1,3 are described as plasticizers for urea-formaldehyde or melamine-formaldehyde condensation products. The coatings obtained in accordance with the disclosure of this patent, although flexible and impact-resistant, are relatively soft, as shown in comparative Example 2, below.

In the company leaflet "1,4-Cyclohexanedimethanol" of Eastman Kodak Company, July 1965, oil-free alkyd resins produced from pelargonic acid, phthalic acid anhydride, pentaerythritol, neopentyl glycol and 1,4-bis(hydroxymethyl)cyclohexane are described and said to be both hard and elastic. However, these polyesters do not fulfill the requirements expected of them, as shown by comparative Example 3, below.

SUMMARY OF THE INVENTION

According to this invention, coating compositions having high elasticity and good hardness and which are resistant to yellowing are produced by the use of an aminoplast-polyester mixture as a binder in which the polyesters have an average molecular weight of between 800 and 5,000 and are produced by the esterification of I. an alcohol mixture consisting of:
1. 1–50 molar percent, preferably 10–40 molar percent, of a polyol component which consists of at least one aliphatic polyol having three to four hydroxyl groups and three to six carbon atoms, and
2. 99–50 molar percent, preferably 90–60 molar percent, of a diol component which consists of i. 30–100 molar percent of 1,4-bis(hydroxymethyl)cyclohexane and
   ii. 70–0 molar percent of one or more aliphatic or other cycloaliphatic diols whose hydroxyl functions are separated by two to eight carbon atoms and up to two of the carbon atoms of which are substituted by oxygen atoms which are separated from each other by at least two carbon atoms, and II. an acid mixture consisting of:
1. 91–33 molar percent, preferably 75–50 molar percent, of at least one aromatic or cycloaliphatic dicarboxylic acid or functional acid derivative thereof convertible to an ester of the alcohol mixture, and
2. 9–67 molar percent, preferably 25–50 molar percent, of at least one aliphatic dicarboxylic acid of four to 12 carbon atoms, or functional acid derivative thereof convertible to an ester of the alcohol mixture.

DETAILED DESCRIPTION OF THE INVENTION

A. Aminoplast Component

Aminoplasts are a conventional component in coating compositions. Many of these have the formula $-NH-CH_2-OR$ wherein R is hydrogen or alkyl of one to four carbon atoms and the unsatisfied valence is an organic moiety. Examples are the condensation products of aldehydes, particularly formaldehyde, with several amino- or amido-group-carrying substances, such as, for example, with melamine, urea, N,N'-ethyleneurea, dicyanodiamide, and benzoguanamine. There can also be used polymers having the structure of copolymerizates into which is polymerized an amide of an $\alpha$-ethylenically unsaturated carboxylic acid having N-methylol- and/or N-methylol-ether groups, for example, such polymers which are obtained following the methods described in the U.S. Pat. No. 2,940,944, and the German Pat. applications Nos. 1,060,596, 1,083,548 and 1,089,549.

Reaction products of polymers containing hydroxyl groups and alkoxymethyl isocyanates can also be utilized. Mixtures of such products are also suitable.

Especially advantageous are the aminoplasts which are modified with alcohols, preferably alkanols of one to four carbon atoms. In place of these resinous products, it is possible to employ with equally good success precursors of aminoplasts, e.g., hexamethylol melamine, dimethylol urea, optionally in the etherified form, for example, hexamethoxymethyl melamine, hexabutoxymethyl melamine, dimethoxymethyl urea, dibutoxymethyl urea, etc. Particularly preferred are the alcohol-modified aminoplasts. Likewise suitable are the low-molecular weight precursors of aminoplasts, such as, for example, dimethylol urea, tetramethylol benzoguanamine, trimethylol melamine or hexamethylol melamine, which can also be employed in a partially or entirely etherified form, for example as dimethoxymethyl urea, tetrakis(methoxymethyl)benzoguanamine, tetrakis(ethoxymethyl)benzoguanamine or polyethers of hexamethylol melamine, such as hexakis(methoxymethyl)melamine or hexakis(butoxymethyl)melamine.

Thus, a wide variety of commercially available aminoplasts can be used for combining with the special polyesters of the present invention. For more details regarding the aminoplasts which can be used, reference is made to "Organic Protective Coatings," Von Fischer and Bobaleck, 1953, Reinhold, pages 210–225; "Lackkunstharze," by H. Wagner and H. F. Sarx, Carl Hanser Verlag, Munich, 4th Edition, 1959, pages 60–74. Of course, it is also possible to use mixtures of all the above N-methylol products. In general then, any compound of the formula $-NH-CH_2-O-R$ can be used wherein R represents hydrogen or alkyl of one to four carbon atoms, and the unsatisfied nitrogen valence is attached to an organic moiety capable of incorporation into a film and which does not interfere with the curing reaction.

It is also possible to add the polyesters to be employed in accordance with the invention to the charge prior to or during the preparation of the aminoplast resins from substances containing several amino and/or amido groups, such as, e.g., urea, benzoguanamine or melamine, and aldehydes, such as, for example, formaldehyde. In this connection, it is, of course, likewise possible to employ concomitantly and additionally customary alcohols for the modification of the thus-formed plasticized aminoplast resins. The methods for the production of such plasticized amino-aldehyde resins for solvent-containing as well as aqueous varnish systems are known; a plurality of suitable operating directives can be found in the literature (see, for example, Houben-Weyl, "Methoden der organischen Chemie" [Methods of Organic Chemistry], 4th Edition, Vol. 14/2, pp. 319 et seq., Georg Thieme Publishers Stuttgart, 1963, or "Ullmanns Encyclopaedie der technischen Chemie" [Ullmann's Encyclopedia of Technical Chemistry], 3rd Edition, Vol. 3, pp. 475 et seq., Urban & Schwarzenberg, Munich, 1953). For purposes of combining with the polyesters employed in accordance with the invention, a plurality of commercial aminoplasts or the defined precursors thereof are available.

B. Polyester Component

The polyester component is a mixture of polyesters having an average molecular weight between 800 and 5,000 produced by the esterification of an alcohol mixture and an acid mixture as defined below. Preferred are those having a molecular weight between 1,000 and 4,000. Especially preferred are those having a molecular weight between 1,500 and 3,000. Coating compositions exhibiting particularly good properties are obtained with polyesters containing predominantly hydroxy groups, i.e., those produced with a molar excess of the alcohol mixture over the acid mixture, e.g., those having an hydroxyl number of 30 to 280, preferably 40 to 150 KOH/g., and an acid number of 1 to 7, preferably 2 to 5 mg. KOH/g.

The polyesters are produced by the esterification of an alcohol mixture and an acid mixture as defined hereinafter.

I. Alcohol Mixture

The alcohol mixture used to form the polyester component of the coating compositions contains a polyol component and a diol component.

1. Polyol Component

The polyol component constitutes 1–50, and preferably 10–40 molar percent of the alcohol mixture. It can contain one or several polyols having three to four hydroxy groups and three to six carbon atoms.

Suitable polyols are, for example, glycerin, trimethylolethane, trimethylolpropane and pentaerythritol. Of these, glycerin is preferred.

2. Diol Component

The diol component constitutes 99–50, preferably 90–60, molar percent of the alcohol mixture. It consists of i. at least 30 molar percent, preferably 80–100 percent of 1,4-bis(hydroxymethyl)cyclohexane, any other diol in the alcohol mixture being ii. an aliphatic or cycloaliphatic diol, or a mixture thereof, whose hydroxyl groups are separated by two to eight carbon atoms and optionally contain up to two oxygen atoms in the chain which are separated from each other by at least two carbon atoms.

The 1,4-bis(hydroxymethyl)cyclohexane can be present in its trans or cis configuration, or as a mixture of both forms.

Examples of diols which can be present in the alcohol mixture along with the 1,4-bis(hydroxymethyl)cyclohexane are acyclic aliphatic diols, e.g., ethylene glycol, 1,2-propanediol, 1,3-propanediol, 1,2-butanediol, 2,3-butanediol, 1,3-butanediol, 1,4-butanediol, 2,2-dimethyl-1,3-propanediol, 1,6-hexanediol, 2-ethylhexanediol-1,3, cycloaliphatic diols, e.g., 1,2-cyclohexanediol, 1,4-cyclohexanediol, 1,2-bis(hydroxymethyl)cyclohexane, 1,3-bis(hydroxymethyl)cyclohexane; $x$,8-bis(hydroxymethyl)tricyclo-[$5.2.1.0^{2,6}$]-decane wherein $x$ represents 3, 4 or 5 diols containing one or more oxygen atoms in the chain, e.g., diethylene glycol, triethylene glycol, dipropylene glycol or tripropylene glycol. In general, these diols contain two to 18, preferably two to 12 carbon atoms. Cycloaliphatic diols can be employed in their cis or trans configuration or as a mixture of both forms.

II. Acid Mixture

The acid mixture used to form the polyester component of the coating composition of this invention consists essentially of a mixture of a cyclic dicarboxylic acid component and an acyclic dicarboxylic acid component.

i. Cyclic Acid Component

The acid mixture contains 91–31, preferably 75–50, e.g., 67–50, molar percent of one or more aromatic or cycloaliphatic dicarboxylic acids or their functional acid derivatives.

Examples for suitable aromatic and cycloaliphatic dicarboxylic acids are phthalic acid, isophthalic acid, hexahydroterephthalic acid, tetrahydrophthalic acid, hexahydrophthalic acid, hexahydroisophthalic acid, as well as endomethylene- and endoethylene-tetrahydrophthalic acid, hexachloroendomethylenetetrahydrophthalic acid or tetrabromophthalic acid. The cycloaliphatic dicarboxylic acids can be employed in their trans or cis configuration or as a mixture of both forms. The use of dicarboxylic acids wherein the carboxyl groups are arranged in the 1,2- or in the 1,3-position is preferred. Especially preferred are those dicarboxylic acids wherein the carboxyl groups are arranged in the 1,2-position. Of these, phthalic acid and hexahydrophthalic acid are especially preferred. In general, the cyclic dicarboxylic acids contain eight to 12 carbon atoms, preferably eight to 10 carbon atoms. The carbocyclic dicarboxylic acids are preferred, especially the monocyclic carbocyclic, e.g., wherein the ring is a benzene, cyclohexane or bridged cyclohexane ring.

ii. Acyclic Acid Component

The acid mixture contains 9–67, preferably 25–50, e.g., 33–50, molar percent of one or more acyclic dicarboxylic acids containing four to 12 carbon atoms or their functional acid derivatives.

Particularly suitable aliphatic dicarboxylic acids are succinic acid, glutaric acid, adipic acid, suberic acid, sebacic acid, decanedicarboxylic acid and 2,2,4-trimethyladipic acid. Although one can use unsaturated dicarboxylic acids, such as, for example, maleic acid, fumaric acid, itaconic acid or citraconic acid, saturated aliphatic dicarboxylic acids, e.g., of four to six carbon atoms are preferred, particularly adipic acid.

In place of the cyclic and/or acyclic dicarboxylic acids themselves, it is possible and often preferable to use a functional acid derivative thereof. For example, instead of the free dicarboxylic acids, esters thereof with lower-alkanols can also be employed, e.g., the dimethyl, diethyl or dipropyl ester. The anhydrides of the dicarboxylic acids can likewise be employed, e.g., phthalic anhydride, hexahydrophthalic anhydride, tetrahydrophthalic anhydride, succinic anhydride, glutaric anhydride and maleic anhydride. Of the anhydrides, phthalic anhydride is preferred.

Coatings of especially improved properties are produced when a polyester is employed which was produced from an alcohol mixture consisting of 15–30 molar percent of the polyol component and 85–70 molar percent of a diol component consisting of more than 70 molar percent, preferably 80–100 molar percent, of 1,4-bis(hydroxymethyl)cyclohexane, and less than 30 molar percent, preferably 20–0 molar percent, of one or more of the above-defined aliphatic or other cycloaliphatic diols, or from an alcohol mixture consisting of 10–30 molar percent of the polyol component and 90–70 molar percent of the diol component consisting of 70–30 molar percent, preferably 60–40 molar percent, of 1,4-bis(hydroxymethyl)cyclohexane, and 30–70 molar percent, preferably 40–60 molar percent, of one or more of the above-defined aliphatic or other cycloaliphatic diols.

POLYESTER PRODUCTION

The polyesters can be produced according to conventional and customary processes, e.g., with or without a catalyst, with or without the introduction of an inert gas stream, as solution condensation in a solvent, as a melt condensation or azeotropic esterification, at temperatures of up to 250° C. or higher so that the water or alkanol produced by the esterification is continuously removed. The esterification takes place almost quantitatively and can be followed by measuring the hydroxyl and acid numbers. The molecular weight of the polyester can be regulated in a simple manner by charging the molar ratio of the alcohol mixture to the dicarboxylic acid mixture. In this connection, to produce polyesters having predominantly hydroxyl groups, $(n+m-1)$ mols of dicarboxylic acid are employed per $n$ mols of diol and $m$ mols of polyol. If it is intended to produce polyesters containing predominantly carboxyl groups, the amount of dicarboxylic acid to be employed is calculated according to the formula $M=n+m(x-1)+1$, wherein $M$ is the molar amount of dicarboxylic acid which must be employed to produce a polyester containing carboxyl groups from $n$ mols of diol and $m$ mols of a polyol containing $x$ hydroxyl groups. Usually, the esterification conditions are selected so that the reaction is as complete as possible, i.e., in case of runs for the production of polyesters containing hydroxyl groups until the acid number is smaller than 5 mg. KOH/g. In case of runs for the production of polyesters containing carboxyl groups, the esterification is continued until the hydroxyl number is below 5 mg. KOH/g.

The esterification temperature is selected so that the losses of readily volatile substances remain small, i.e., during at least the first period of the esterification, the process is conducted at a temperature below the boiling point of the lowest-boiling starting substance.

When producing the polyesters, it must be kept in mind that the molecular weight of the polyester as well as the composition thereof affect the properties of the varnish films prepared therefrom. At higher average molecular weights, the hardness of the varnish film is, in general, reduced, whereas the elasticity increases. At lower molecular weights, the flexibility of the varnish film is decreased and the hardness increased. Differences in the composition of the polyester have similar effects: With a higher proportion of aliphatic dicarboxylic acids and with a longer chain length of the aliphatic dicarboxylic acids, the elasticity of the varnish film increases, whereas its hardness is decreased. Conversely, with an increasing proportion of aromatic and/or cycloaliphatic dicarboxylic acids in the polyester, the varnish film becomes harder and less flexible. A similar influence is exerted by the acyclic diols. With an increasing chain length of the open-chain diols, and with a rising proportion of these diols in the polyester, the varnish film becomes softer and more flexible. With an increasing proportion of diols with short and branched carbon chains or with cycloaliphatic rings in the polyester, the varnish films produced from these polyesters normally become harder and less elastic. Also, the molar ratio of polyol to diol is of importance relative to the mechanical properties of the varnish films. With a decreasing molar ratio of polyol to diol, the hardness of the films likewise decreases and the elasticity thereof is increased. Conversely, at higher molar ratios of polyol to diol, the flexibility of the varnish films is reduced and the hardness thereof is improved. Knowing these rules, it is possible without difficulty to select, within the scope of the claimed range, polyesters exhibiting properties which are optimum for the respective purpose for which the coating compositions of this invention are employed.

AMINOPLAST-POLYESTER MIXTURE

To produce the coating compositions of this invention, the polyester and the aminoplast or precursor thereof are normally first dissolved in conventional varnish solvents, such as, for example, propanol, isopropanol, butanol, ethyl acetate, butyl acetate, ethyl glycol, ethyl glycol acetate, butyl glycol, methyl ethyl ketone, methyl isobutyl ketone, cyclohexanone, trichloroethylene, or mixtures of various ones of such solvents. It is possible and advisable for economical reasons to also employ additionally more or less large amounts of less polar solvents, e.g., benzene, toluene, xylene or higher-boiling aromatic cuts. The amount of these less polar solvents employed can be selected as desired within the scope of the solubility of the selected polyesters therein and their compatibility with the aminoplasts which are employed, e.g., up to 80 percent and higher of the total solvent mixture. When using polyesters containing 1,4-bis(hydroxymethyl)cyclohexane, predominantly or exclusively as the diol, nonpolar solvents can often be employed exclusively.

When using polyesters having a high acid number, i.e., polyesters containing a significant number of non-esterified carboxyl groups, it is also possible to produce aqueous solutions. This can be done in accordance with conventional and customary techniques (see, for example, W. A. Riese, "Loeserfreie Anstrichsysteme" [Solvent-free Coating Systems], Curt R. Vincentz Publishers, Hannover, 1967, pp. 432 et seq.). In this connection, the carboxyl groups are normally neutralized entirely or partially with amines and, optionally, water-miscible solvents are simultaneously employed which serve as solubilizers. Of course, when producing aqueous varnish solutions, it is necessary to utilize water-soluble aminoplasts. The hereinabove-defined precursors of the aminoplasts are particularly suitable for this purpose.

The weight ratio of polyester to the aminoplast can vary between 50:50 and 90:10, preferably between 65:35 and 85:15. The ratio which is optimum for the selected end use purpose of the varnishes can be readily determined by a small number of preliminary experiments. Often, by increasing the proportion of aminoplast to polyester, the hardness of the varnish films is increased and the elasticity thereof is lessened, whereas when lowering the aminoplast to polyester proportion, the hardness decreases and the flexibility becomes larger.

The total amount of binder contained in the varnishes can be varied within customary limits, depending on the end-use application.

The varnishes can contain the conventional additives and auxiliary agents, for example pigments, flow agents, and additional other binders, such as, for example, epoxy resins and silicone resins, the latter containing hydroxyl groups.

The thus-obtained varnish is applied and baked at temperatures of between 100° and 250° C. The cross-linking reactions taking place during this process are catalytically accelerated by means of acids. When using polyesters having a very low acid number, it is thus possible to add acidic substances to the varnish. By the addition of 0.5 percent of p-toluenesulfonic acid (based on the total binder), for example, the cross-linking reaction is greatly accelerated. With the addition of larger amounts of acid, coatings can also be produced which dry at room temperature.

The acid number of the polyester can also be subsequently increased by reacting a polyester low in acid with about 1–5 percent of an anhydride of a relatively strong dicarboxylic acid, for example, maleic anhydride; thus, the baking temperatures can be lowered even without the addition of strongly acidic substances.

The coatings produced in accordance with this invention exhibit many good properties. They have a high gloss, can be very well pigmented, and show an excellent resistance against yellowing, as demonstrated by a heat aging treatment of 72 hours at 150° C. When subjecting the coatings to heat aging of 72 hours at 100° C., no visible yellowing can be detected. The coatings are resistant to solvents, e.g., xylene, petroleum ether-benzene mixtures, esters and ketones. Moreover, they exhibit good resistance to acid and alkali. In salt spray tests, tropical condition tests, and tests in the Weather-Ometer, they show an excellent corrosion-protective effect and weatherproofness.

However, the most outstanding property of the coatings of this invention is their combination of great elasticity and high hardness, which is retained even on baking.

The elastic behavior of coatings is usually determined by the Erichsen depression test (in accordance with German Industrial Standard [DIN] 53,156) using as a standard of elasticity, the depression (in mm.) of an enameled sheet metal at which the varnish coating cracks. An essential element of this testing method is that the deformation of the coating takes place slowly (advancement: 0.2 mm./sec.).

The impact depression measurement gives an indication of the reaction of the coatings to sudden deformation. This measurement can be conducted, for example, with the impact depression device 226/D of the Erichsen company, Hemer-Sundwig. In this device, a hemisphere having a radius of 10 mm. is suddenly impacted by a falling 8 kg. weight into a metal sheet on the back of the varnish-coated side. By varying the height of the falling weight, the depression can be varied. The impact depression value is the depth (in mm.) of the depression at which the varnish coating cracks. The values given in the examples were obtained in this manner. In several examples, the value is stated to be >5 mm., since the above-described test cannot make a greater depression in the 1 mm. thick deep-drawn metal sheets employed in the test.

As has been set forth in connection with the discussion of the state of the art, and as has been proven by comparative tests, coatings of polyesters and aminoplasts have been conventional which are flexible and also withstand impact stresses. However, these coatings exhibit very low hardness values (according to DIN 53,157). On the other hand, coatings of great hardness are known which, however, exhibit a low elasticity, or none at all, or which, although elastic, have a number of other disadvantages, such as a tendency to yellow and an unsatisfactory solvent resistance. In contrast thereto, the coatings obtained in accordance with the invention exhibit a high elasticity as well as great hardness and do not have any of the above-mentioned disadvantages.

This array of properties opens up a versatile range of applications to the coatings. In addition to being employed for varnishing individual parts exposed to impact stresses, one important aspect is, above all, the varnishing of materials which are postformed—for example by punching.

Therefore, the coating compositions of this invention may be used for varnishing or enameling of, e.g., automobile bodies, refrigerators, washing machines, etc.; also they are suited for coil-coating. The coatings produced in accordance with this invention may be applied by different modes, e.g., spraying, dipping, brushing and wiping.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Unless otherwise indicated, all percentages and ratios are on a weight basis.

PREPARATION OF THE POLYESTER

A. Under a nitrogen atmosphere and with constant removal of the water as it is formed, 1,296 g. of 1,4-bis(hydroxymethyl)-cyclohexane (9 mols), 276 g. of glycerin (3 mols), 888 g. of phthalic anhydride (6 mols), 730 g. of adipic acid (5 mols) and 200 g. of xylene are heated to 200° C. for 8 hours. The thus-produced polyester has an acid number of 4.5 mg. KOH/g. and a hydroxyl number of 91.4 mg. KOH/g. After cooling the melt to 140° C. the polyester is dissolved in xylene to form a 60 percent solution.

B. A mixture of 432 g. of 1,4-bis(hydroxymethyl)cyclohexane (3 mols), 184 g. of glycerin (2 mols), 124 g. of ethylene glycol (2 mols), 532.8 g. of phthalic anhydride (3.6 mols) and 350.4 g. of adipic acid (2.4 mols) is heated, under agitation and passing a weak nitrogen stream therethrough, in accordance with the following time-temperature plan: 2 hours at 140° C.; 2 hours at 160° C.; 4 hours at 180° C.; 4 hours at 190° C.; and 20 hours at 200° C. During this period, a total of 140 g. of water is separated. Thereafter, the agitation is continued for 15 minutes at 200° C. under a vacuum of 20 mm. of Hg. The clear, colorless resin exhibits an acid number of 1.9 mg. KOH/g. and a hydroxyl number of 146.5 mg. KOH/g, corresponding to an average molecular weight of 1,510. The polyester is dissolved in a mixture of 8 parts by weight of xylene, 1 part by weight of butanol and 1 part by weight of ethyl glycol acetate to form a 60 percent solution.

RAISING THE ACID NUMBER OF A POLYESTER 1.2 percent of maleic anhydride (based on the pure polyester) is added to the melt of a polyester having a low acid number. After the added anhydride has been completely dissolved, the reaction mixture is heated for 1 hour to 120° C., whereby the acid number of the polyester is increased by 8.56 mg. KOH/g.

The step of raising the acid number of a polyester is normally conducted in the melt. However, no difficulties are presented in conducting the same reaction in the solution of the polyester under the above-mentioned reaction conditions. Care must be taken that the solvent does not contain any functional groups which can also react with the acid anhydride under the indicated reaction conditions.

A. PREPARATION OF A VARNISH

The solutions of the polyesters in suitable solvents, normally a mixture of xylene and a polar solvent, are mixed with a commercially available 55 percent solution of a melamine-formaldehyde condensate in a xylene-butanol mixture (1:1), or with a commercially available hexamethylol melamine derivative, in the desired solids ratio. In order to obtain a polyester : melamine resin ration of 7:3, 117 g. of a 60 percent solution of the polyesters is mixed, for example, with 54.5 g. of the above-mentioned melamine resin solution.

B. PREPARATION OF AN ENAMEL

In order to prepare an enamel, a clear varnish is pigmented with TiO$_2$ in a binder : pigment ratio of 2:1.

C. PRODUCTION AND TESTING OF THE COATING COMPOSITIONS

For testing purposes, the clear varnish or the enamel is applied to metal test sheets and glass plates and baked. In order to lower the baking temperature, 0.5 percent p-toluenesulfonic acid (based on the total binder) is added to varnish solutions produced using polyesters of a low acid number. The coating thickness of the films being tested is, in all examples, 40–60 μ. The hardness test is conducted according to DIN 53,157. Elasticity is determined in accordance with the methods described hereinabove.

The results of Examples 1–32 are compiled in Table 1, in which the type of the melamine resin employed is likewise set forth. (In the column headed "Type of Melamine Resin" the symbol K means that a butylated melamine-formaldehyde condensate was employed, whereas HMM indicates the use of a hexamethylol melamine derivative.)

Similar results are obtained when employing as the binder, in place of a mixture of polyester and aminoplast as described hereinabove, a so-called plasticized amino-aldehyde resin, wherein the polyesters to be employed in accordance with the invention are added to the charge during the preparation of the aminoplast resins produced from substances containing amino and/or amido groups and aldehydes. Coatings having similar properties are also obtained by employing, in place of the above-described mixture of aminoplast resins and polyesters, copolymers containing polymerized therein, additionally, acrylic acid esters, methacrylic acid esters and/or styrene, as well as optionally small amounts of acrylic acid or methacrylic acid, 5–35 percent by weight of N-methylol acrylamide, N-methylol methacrylamide and/or the derivatives thereof etherified on the N-methylol group.

Table 2 contains the test values of the coatings produced from the polyesters described in the following Comparative Examples 1-3.

COMPARATIVE EXAMPLE 1

(Alkyd Resin No. 8531 — 69 from "Deutsche Farbenzeitschrift" 20, 519 [1966])

A mixture of 257 g. of trimethylolpropane, 351 g. of neopentyl glycol, 498 g. of isophthalic acid, 292 g. of adipic acid, and 15 ml. of xylene was esterified, following exactly the reaction conditions described on page 521 of the above-mentioned reference. Upon reaching an acid number of 28 mg. KOH/g., the charge was at once cooled with the aid of ice. In order to accelerate the cooling process, 500 g. of a mixture of 90 parts of xylene and 10 parts of butanol was additionally carefully added using a reflux condenser. The exact maintaining of the reaction conditions, as mentioned above, and the measures taken to effect rapid cooling are necessary to prevent premature cross-linking. The thus-obtained solution was diluted with another 312 g. of the above-mentioned xylene/butanol mixture in order to produce a 60 percent resin solution.

COMPARATIVE EXAMPLE 2

(Example IV of U.S. Pat. No. 2,460,186)

148 g. of phthalic anhydride, 202 g. of sebacic acid, 278 g. of 2-ethylhexanediol-1,3, 28 g. of glycerin and 110 ml. of xylene are slowly heated, in 11.5 hours, to 230° C. and the thus-formed water is separated by means of a water trap. Near the end of the esterification process, the solvent is gradually distilled off and the temperature is maintained for 3 hours at 230° C.

COMPARATIVE EXAMPLE 3

(Alkyd Resin from the Company Leaflet "1,4-Cyclohexanedimethanol" of Eastman Kodak Company of July 1965).

Under the conditions set forth on page 11 of the above-mentioned company leaflet, a polyester is produced from 160 g. of pelargonic acid, 300.6 g. of phthalic anhydride, 70.0 g. of neopentyl glycol, 95.6 g. of 1,4-bis(hydroxymethyl)cyclohexane, and 133.2 g. of pentaerythritol. The thus-obtained polyester exhibits an acid number of 7.6 mg. KOH/g. and is diluted with xylene to a 60 percent solution.

TABLE 1

| Example No. | Polyester from [mol] | Average molecular weight | Weight ratio, polyester: melamine resin: TiO₂ | Type of melamine resin | Catalyst | Baking conditions, °C./min. | Hardness according to DIN 53,157 [sec.] | Deep drawability acc. to DIN 53,156 [mm.] | Impact depression [mm.] |
|---|---|---|---|---|---|---|---|---|---|
| 1 | 3 CHDM, 1 Gly, 1.5 PA, 1.5 ADA | 935 | 70:30:0 / 80:20:0 / 80:20:50 / 80:20:0 / 80:20:50 | HMM / HMM / HMM / K / K | 0.5% pTS | 130°/30′ | 205 / 191 / 180 / 197 / 184 | >10 / >10 / 8.9 / 9.9 / 7.6 | >5 / >5 / 4-5 / 4-5 / 3 |
| 2 | 3 CHDM, 1 TMP, 1.5 PA, 1.5 ADA | 870 | 70:30:0 / 80:20:0 / 80:20:50 / 80:20:0 / 80:20:50 | HMM / HMM / HMM / K / K | 0.5% pTS | 130°/30′ | 173 / 168 / 151 / 162 / 169 | 8.6 / 9.5 / 6.4 / 7.3 / 6.2 | 4-5 / >5 / 2-3 / 3-4 / 2 |
| 3 | 4 CHDM, 1 Gly, 2 PA, 2 ADA | 1,160 | 70:30:0 / 70:30:50 / 80:20:0 / 80:20:0 / 80:20:50 | HMM / HMM / HMM / K / K | 0.5% pTS | 130°/30′ | 209 / 189 / 181 / 212 / 191 | >10 / >10 / >10 / >10 / 8.8 | >5 / >5 / >5 / >5 / 4-5 |
| 4 | 4 CHDM, 2 Gly, 3 PA, 2 ADA | 1,420 | 80:20:0 / 80:20:50 / 80:20:0 / 80:20:50 | HMM / HMM / K / K | 0.5% pTS / 0.5% pTS / 1.2% MA / 1.2% MA | 130°/30′ | 192 / 187 / 196 / 182 | >10 / 8.8 / >10 / 8.2 | >5 / 3-4 / >5 / 3 |
| 5 | 5 CHDM, 3 Gly, 4 PA, 3 ADA | 1,980 | 70:30:0 / 80:20:50 / 70:30:0 / 80:20:50 | HMM / HMM / K / K | 0.5% pTS / 0.5% pTS / 1.2% MA / 1.2% MA | 130°/30′ | 211 / 186 / 209 / 173 | >10 / >10 / >10 / 9.5 | >5 / 5 / >5 / 4 |
| 6 | 6 CHDM, 2 Gly, 4 PA, 3 ADA | 2,010 | 70:30:0 / 80:20:50 / 70:30:0 / 80:20:50 | HMM / HMM / K / K | 0.5% pTS / 0.5% pTS / 1.2% MA / 1.2% MA | 130°/30′ | 196 / 180 / 198 / 176 | >10 / 8.2 / 9.7 / 8.1 | >5 / >5 / >5 / >5 |
| 7 | 7 CHDM, 3 Gly, 5 PA, 4 ADA | 2,420 | 70:30:0 / 80:20:50 / 80:20:0 / 80:20:50 | HMM / HMM / K / K | 0.5% pTS / 0.5% pTS / 1.2% MA / 1.2% MA | 130°/30′ | 204 / 184 / 196 / 181 | >10 / 9.6 / >10 / 8.6 | >5 / >5 / >5 / >5 |
| 8 | 9 CHDM, 3 Gly, 6 PA, 5 ADA | 2,920 | 70:30:0 / 80:20:0 / 70:30:50 / 80:20:50 | K / K / K / K | 0.5% pTS | 130°/30′ | 206 / 192 / 187 / 175 | >10 / >10 / 8.7 / 9.3 | >5 / >5 / >5 / >5 |
| 9 | 10 CHDM, 2 Gly, 6 PA, 5 ADA | 2,620 | 70:30:0 / 80:20:0 / 70:30:50 / 80:20:50 | K / K / K / K | 0.5% pTS | 130°/30′ | 201 / 196 / 191 / 185 | >10 / >10 / 9.8 / >10 | >5 / >5 / >5 / >5 |
| 10 | 10 CHDM, 2 TMP, 6 PA, 5 ADA | 2,870 | 70:30:0 / 80:20:0 / 70:30:50 / 80:20:0 | K / K / K / K | 0.5% pTS | 130°/30′ | 212 / 203 / 165 / 185 | >10 / >10 / 6.7 / 8.3 | >5 / >5 / 2-3 / >5 |
| 11 | 10 CHDM, 2 PET, 6 PA, 5 ADA | 3,140 | 70:30:0 / 80:20:0 / 70:30:50 / 80:20:50 / 70:30:0 / 80:20:0 / 70:30:50 / 80:20:50 | K / K / K / K / HMM / HMM / HMM / HMM | 0.5% pTS | 130°/30′ | 221 / 217 / 185 / 185 / 210 / 196 / 185 / 188 | 7.2 / 8.6 / 4.8 / 5.4 / 9.1 / 9.8 / 5.4 / 6.1 | 3-4 / 4-5 / 2 / 3 / >5 / >5 / 3-4 / 4 |
| 12 | 5 CHDM, 2 EG, 2 Gly, 4.8 PA, 3.2 ADA | 1,975 | 80:20:50 / 70:30:0 / 80:20:50 | HMM / K / K | 0.5% pTS | 130°/30′ | 206 / 191 / 201 / 178 | >10 / 9.7 / >10 / 9.9 | >5 / >5 / >5 / 4-5 |
| 13 | 3 CHDM, 1 EG, 1 Gly, 2 PA, 2 ADA | 1,120 | 70:30:0 / 80:20:50 / 70:30:0 / 80:20:50 | HMM / HMM / K / K | 0.5% pTS | 130°/30′ | 176 / 169 / 181 / 156 | >10 / >10 / >10 / 8.6 | >5 / 4-5 / >5 / 4 |
| 14 | 6 CHDM, 2 PG, 2 Gly, 5 PA, 4 ADA | 2,280 | 70:30:0 / 80:20:50 / 80:20:0 / 80:20:50 | HMM / HMM / K / K | 0.5% pTS | 130°/30′ | 191 / 176 / 183 / 153 | >10 / >10 / >10 / 9.2 | >5 / >5 / >5 / 4-5 |
| 15 | 5 CHDM, 1 DG, 2 Gly, 4 PA, 3 ADA | 1,990 | 70:30:0 / 80:20:50 / 70:30:0 / 80:20:50 | HMM / HMM / K / K | 0.5% pTS | 130°/30′ | 187 / 183 / 193 / 184 | >10 / >10 / >10 / 8.7 | >5 / >5 / >5 / >5 |

TABLE 1

| Example No. | Polyester from [mol] | Average molecular weight | Weight ratio, polyester: melamine resin: TiO₂ | Type of melamine resin | Catalyst | Baking conditions, °C./min. | Hardness according to DIN 53,157 [sec.] | Deep drawability acc. to DIN 53,156 [mm.] | Impact depression [mm.] |
|---|---|---|---|---|---|---|---|---|---|
| 16 | 5 CHDM, 1 DPG, 2 Gly, 4 PA, 3 ADA | 2,150 | 70:30:0 / 80:20:50 / 70:30:0 / 80:20:50 | HMM / HMM / K / K | 0.5% pTS / 0.5% pTS / 0.5% pTS / 0.5% pTS | 130°/30' / 130°/30' / 130°/30' / 130°/30' | 194 / 188 / 200 / 177 | >10 / >10 / >10 / 8.4 | >5 / >5 / >5 / 5 |
| 17 | 2 CHDM, 1 EG, 1 Gly, 1.8 PA, 1.2 ADA | 845 | 70:30:0 / 80:20:50 / 80:20:0 | HMM+ / HMM / K+ | 0.5% pTS+ / 0.5% pTS / 0.5% pTS | 130°/30' / 130°/30' / 130°/30' | 203 / 183 / 197 | >10 / 8.3 / 9.1 | >5 / 3 / 4 |
| 18 | 2 CHDM, 1 EG, 2 Gly, 2.4 PA, 1.6 ADA | 1,030 | 70:30:0 / 80:20:50 / 80:20:0 | HMM / HMM / K | 0.5% pTS / 0.5% pTS / 0.5% pTS | 130°/30' / 130°/30' / 130°/30' | 219 / 203 / 220 | >10 / 7.8 / 8.7 | >5 / 3-4 / 4 |
| 19 | 3 CHDM, 2 EG, 1 Gly, 3 PA, 2 ADA | 1,360 | 70:30:0 / 80:20:50 / 70:30:0 / 75:25:50 / 75:25:50 | HMM / HMM / K / K / K | 0.5% pTS / 0.5% pTS / 0.5% pTS / 0.5% pTS / 1.2% MA+ | 130°/30' / 130°/30' / 130°/30' / 130°/30' / 130°/30' | 196 / 169 / 191 / 165 / 151 | >10 / 9.9 / >10 / 9.0 / 8.6 | >5 / 5 / >5 / 4-5 / 5 |
| 20 | 2 CHDM, 3 EG, 1 Gly, 3 PA, 2 ADA | 1,270 | 70:30:0 / 80:20:50 / 70:30:0 / 80:20:50 | HMM / HMM / K / K | 0.5% pTS / 0.5% pTS / 0.5% pTS / 0.5% pTS | 130°/30' / 130°/30' / 130°/30' / 130°/30' | 183 / 168 / 186 / 150 | >10 / >10 / >10 / 9.7 | >5 / 4-5 / >5 / >5 |
| 21 | 4 CHDM, 3 EG, 1 Gly, 4 PA, 3 ADA | 1,720 | 70:30:0 / 80:20:50 / 70:30:0 / 80:20:50 | HMM / HMM / K / K | 0.5% pTS / 0.5% pTS / 0.5% pTS / 0.5% pTS | 130°/30' / 130°/30' / 130°/30' / 130°/30' | 176 / 158 / 181 / 153 | >10 / >10 / >10 / 9.3 | >5 / 5 / >5 / 5 |
| 22 | 5 CHDM, 4 EG, 1 Gly, 5.4 PA, 3.6 ADA | 2,350 | 70:30:0 / 80:20:50 / 70:30:0 / 80:20:50 | HMM / HMM / K / K | 0.5% pTS / 0.5% pTS / 0.5% pTS / 0.5% pTS | 130°/30' / 130°/30' / 130°/30' / 130°/30' | 156 / 134 / 161 / 128 | >10 / >10 / >10 / 9.2 | >5 / >5 / >5 / 5 |
| 23 | 3 CHDM, 2 EG, 2 Gly, 3.6 PA, 2.4 ADA | 1,510 | 70:30:0 / 80:20:50 / 70:30:0 / 80:20:50 | HMM / HMM / K / K | 0.5% pTS / 0.5% pTS / 0.5% pTS / 0.5% pTS | 130°/30' / 130°/30' / 130°/30' / 130°/30' | 211 / 203 / 201 / 173 | >10 / 8.8 / >10 / 9.0 | >5 / 4-5 / >5 / 4-5 |
| 24 | 5 CHDM, 3 EG, 2 Gly, 5.4 PA, 3.6 ADA | 2,300 | 70:30:0 / 80:20:50 / 70:30:0 / 80:20:50 | HMM / HMM / K / K | 0.5% pTS / 0.5% pTS / 0.5% pTS / 0.5% pTS | 130°/30' / 130°/30' / 130°/30' / 130°/30' | 217 / 191 / 212 / 196 | >10 / 9.3 / >10 / 8.8 | >5 / 5 / >5 / 4-5 |
| 25 | 3 CHDM, 2 PG, 1 Gly, 3 PA, 2 ADA | 1,440 | 70:30:0 / 80:20:50 / 80:20:0 | HMM / HMM / K | 0.5% pTs / 0.5% pTs / 0.5% pTs | 130°/30' / 130°/30' / 130°/30' | 197 / 174 / 186 | >10 / >10 / 9.4 | >5 / 3-4 / 3-4 |
| 26 | 5 CHDM, 3 PG, 1 Gly, 5 PA, 3 ADA | 2,270 | 70:30:0 / 80:20:50 / 70:30:0 / 80:20:50 | HMM / HMM / K / K | 0.5% pTs / 0.5% pTs / 0.5% pTs / 0.5% pTs | 130°/30' / 130°/30' / 130°/30' / 130°/30' | 181 / 161 / 186 / 153 | >10 / >10 / >10 / 9.6 | >5 / >5 / >5 / 4-5 |
| 27 | 5 CHDM, 3 PG, 2 Gly, 5 PA, 4 ADA | 2,500 | 70:30:0 / 80:20:50 / 70:30:0 / 80:20:50 | HMM / HMM / K / K | 0.5% pTs / 0.5% pTs / 0.5% pTs / 0.5% pTs | 130°/30' / 130°/30' / 130°/30' / 130°/30' | 187 / 173 / 191 / 164 | >10 / >10 / >10 / 9.6 | >5 / >5 / >5 / 5 |
| 28 | 4 CHDM, 4 PG, 2 Gly, 5 PA, 4 ADA | 2,460 | 70:30:0 / 80:20:50 / 70:30:0 / 80:20:50 | HMM / HMM / K / K | 0.5% pTs / 0.5% pTs / 0.5% pTs / 0.5% pTs | 130°/30' / 130°/30' / 130°/30' / 130°/30' | 203 / 171 / 186 / 167 | >10 / >10 / >10 / 9.2 | >5 / >5 / >5 / 4-5 |
| 29 | 5 CHDM, 2 EG, 1 PG, 1 Gly, 5 PA, 3 ADA | 2,340 | 70:30:0 / 80:20:50 / 70:30:0 / 80:20:50 | HMM / HMM / K / K | 0.5% pTs / 0.5% pTs / 0.5% pTs / 0.5% pTs | 130°/30' / 130°/30' / 130°/30' / 130°/30' | 197 / 173 / 191 / 161 | >10 / >10 / >10 / 9.5 | >5 / >5 / >5 / >5 |
| 30 | 5 CHDM, 1 EG, 2 PG, 1 Gly, 5 PA, 3 ADA | 2,180 | 70:30:0 / 80:20:50 / 70:30:0 / 80:20:50 | HMM / HMM / K / K | 0.5% pTs / 0.5% pTs / 0.5% pTs / 0.5% pTs | 130°/30' / 130°/30' / 130°/30' / 130°/30' | 203 / 181 / 202 / 173 | >10 / >10 / >10 / 9.5 | >5 / >5 / >5 / 5 |
| 31 | 5 CHDM, 2 EG, 1 PG, 2 Gly, 5 PA, 4 ADA | 2,230 | 70:30:0 / 80:20:50 / 70:30:0 / 80:20:50 | HMM / HMM / K / K | 0.5% pTs / 0.5% pTs / 0.5% pTs / 0.5% pTs | 130°/30' / 130°/30' / 130°/30' / 130°/30' | 179 / 169 / 171 / 149 | >10 / >10 / >10 / 9.3 | >5 / >5 / >5 / >5 |
| 32 | 3 CHDM, 2 DG, 2 Gly, 4 PA, 2 ADA | 1,620 | 70:30:0 / 80:20:50 / 70:30:0 / 80:20:50 | HMM / HMM / K / K | 0.5% pTs / 0.5% pTs / 0.5% pTs / 0.5% pTs | 130°/30' / 130°/30' / 130°/30' / 130°/30' | 175 / 137 / 173 / 148 | >10 / >10 / >10 / 9.8 | >5 / >5 / >5 / >5 |

Abbreviations:
CHDM 1,4-bis(hydroxymethyl)cyclohexane
GLY Glycerin
PA Phthalic Anhydride
ADA Adipic Acid
HMM Hexamethylol melamine derivative
K Melamine-formaldehyde condensate
PTS p-toluenesulfonic acid
TMP Trimethylolpropane
MA Maleic anhydride PET Pentaerythritol
EG Ethylene glycol
PG 1,2-Propanediol
DG Diethylene glycol
DPG Dipropylene glycol

[the polyester which is low in acid is brought to a higher acid number by reaction with the indicated amount of maleic anhydride, based on the pure polyester, in accordance with the method described hereinbefore.]

TABLE 2

| Comparative example | Weight ratio, polyester: melamine resin:TiO₂ | Melamine resin | Catalyst | Baking conditions, °C./min. | Hardness according to DIN 53,157 [sec.] | Deep drawability according to DIN 53,156 [mm.] | Impact depression [mm.] |
|---|---|---|---|---|---|---|---|
|  | 70:30:0 | K | 0.5% pTSA | 150°/30' | 216 | 5.1 | <1 |
|  | 70:30:0 | HMM | 0.5% pTSA | 150°/30' | 217 | 5.1 | 2 |
| 1 | 70:30:100 | K | --- | 150°/30' | 185 | 1.8 | <1 |
|  | 70:30:100 | HMM | --- | 150°/30' | 173 | 6.8 | 1-2 |
|  | 70:30:0 | HMM | 0.5% pTSA | 130°/30' | 28 | 9.2 | >5 |
| 2 | 70:30:0 | K | 0.5% pTSA | 130°/30' | 24 | 8.3 | >5 |
|  | 70:30:0 | K | --- | 130°/30' | 177 | 1.5 | <1 |
|  | 70:30:0 | K | 0.5% pTSA | 130°/30' | 177 | 1.5 | <1 |
| 3 | 70:30:0 | HMM | 0.5% pTSA | 130°/30' | 178 | 2.5 | <1 |
|  | 70:30:40 | K | --- | 150°/30' | 109 | 1.8 | <1 |
|  | 70:30:40 | HMM | --- | 150°/30' | 105 | 6.0 | <1 |

Abbreviations:
K = Melamine-formaldehyde condensate.
HMM = Hexamethylol melamine derivative.
pTSA = p-toluenesulfonic acid.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalents of the following claims.

What is claimed is:

1. A hard, flexible film-forming N-methylol or N-methylol ether aminoplast-polyester coating composition comprising 50–10 percent by weight of the aminoplast component and 50–90 percent by weight of a mixture of polyesters having an average molecular weight between 800 and 5,000 produced by the esterification of I. an alcohol mixture consisting essentially of:
      1. 10–40 molar percent of a polyol component of at least one aliphatic polyol having three to four hydroxyl groups and three to six carbon atoms, and
      2. 90–60 molar percent of a diol component of
         i. 30–100 molar percent of 1,4-bis-(hydroxymethyl)cyclohexane, and
         ii. 70–0 molar percent of another diol selected from the group consisting of aliphatic and cycloaliphatic diols and mixtures thereof whose hydroxyl groups are separated by two to eight carbon atoms and contain from zero to two oxygen atoms in the chain which are separated from each other by at least two carbon atoms, and
   II. an acid mixture consisting essentially of
      1. 91–33 molar percent of a cyclic acid component of at least one aromatic or cycloaliphatic dicarboxylic acid or a functional acid derivative thereof convertible to said ester with said alcohol mixture, and
      2. 9–67 molar percent of an acyclic acid component of at least one aliphatic dicarboxylic acid of four to 12 carbon atoms or a functional acid derivative thereof convertible to said ester with said alcohol mixture.

2. A coating composition according to claim 1 wherein the polyesters have an average molecular weight between 1,000 and 4,000.

3. A coating composition according to claim 2 wherein the polyesters have an average molecular weight between 1,500 and 3,000.

4. A coating composition according to claim 1 wherein the acyclic acid component of the acid mixture contains four to six carbon atoms.

5. A coating composition according to claim 1 wherein the acid mixture consists of 67–50 molar percent of the cyclic acid component and 33–50 molar percent of the acyclic acid component.

6. A coating composition according to claim 1 wherein the cyclic acid component of the acid mixture is phthalic acid anhydride.

7. A coating composition according to claim 1 wherein the acyclic acid component of the acid mixture is adipic acid.

8. A coating composition according to claim 1 wherein the polyol component of the alcohol mixture is glycerin.

9. A coating composition according to claim 1 wherein the diol component of the alcohol mixture consists of a mixture of 1,4-bis(hydroxymethyl)cyclohexane and ethylene glycol.

10. A coating composition according to claim 1 wherein the diol component of the alcohol mixture consists of a mixture of 1,4-bis(hydroxymethyl)cyclohexane and 1,2-propanediol.

11. A coating composition according to claim 1 wherein the diol component of the alcohol mixture consists of a mixture of 1,4-bis(hydroxymethyl)cyclohexane and diethylene glycol.

12. A coating composition according to claim 1 wherein the diol component of the alcohol mixture consists of 1,4-bis(hydroxymethyl)cyclohexane and dipropylene glycol.

13. A coating composition according to claim 6 wherein the alcohol mixture consists of 15–30 molar percent of the polyol component and 85–70 molar percent of a diol component consisting of:
   i. more than 70 molar percent of 1,4-bis(hydroxymethyl)cyclohexane and
   ii. less than 30 molar percent of any other diol.

14. A coating composition according to claim 13 wherein the diol component of the alcohol mixture consists entirely of 1,4-bis(hydroxymethyl)cyclohexane.

15. A coating composition according to claim 1 wherein the alcohol mixture consists of:
   10–30 molar percent of the polyol component and 90–70 molar percent of a diol component consisting of:
   i. 60–40 molar percent of 1,4-bis(hydroxymethyl)cyclohexane and
   ii. 40–60 molar percent of another diol.

16. A coating composition according to claim 1 wherein the alcohol mixture consists of 10–40 molar percent of glycerin and 90–60 molar percent of a mixture of 1,4-bis-(hydroxymethyl)cyclohexane and a glycol selected from the group consisting of ethylene glycol, 1,2-propanediol, diethylene glycol and dipropylene glycol, and the acid mixture consists of 33–50 percent of an acyclic dicarboxylic acid containing four to six carbon atoms and 67–50 percent of a cyclic acid component selected from the group consisting of phthalic acid and adipic acid.

17. A coating composition according to claim 16 wherein the polyesters have an average molecular weight between 1,000 and 4,000.

18. A coating composition according to claim 17 wherein the polyesters have an average molecular weight between 1,500 and 3,000.

* * * * *